US010242392B2

(12) United States Patent
Fukunaga

(10) Patent No.: US 10,242,392 B2
(45) Date of Patent: Mar. 26, 2019

(54) MESSAGE VIDEO DELIVERY APPARATUS, MESSAGE VIDEO DELIVERY METHOD, AND MESSAGE VIDEO DELIVERY PROGRAM

(71) Applicant: Ko Fukunaga, Tokyo (JP)

(72) Inventor: Ko Fukunaga, Tokyo (JP)

( * ) Notice: Subject to any disclaimer, the term of this patent is extended or adjusted under 35 U.S.C. 154(b) by 0 days.

(21) Appl. No.: 16/072,915

(22) PCT Filed: Jan. 19, 2017

(86) PCT No.: PCT/JP2017/001655
§ 371 (c)(1),
(2) Date: Jul. 26, 2018

(87) PCT Pub. No.: WO2017/135039
PCT Pub. Date: Aug. 10, 2017

(65) Prior Publication Data
US 2019/0034988 A1    Jan. 31, 2019

(30) Foreign Application Priority Data

Feb. 4, 2016 (JP) ................................ 2016-019588

(51) Int. Cl.
*G06Q 30/00* (2012.01)
*G06F 17/30* (2006.01)
(Continued)

(52) U.S. Cl.
CPC ......... *G06Q 30/0601* (2013.01); *G06Q 50/10* (2013.01); *H04L 51/08* (2013.01); *H04L 51/10* (2013.01)

(58) Field of Classification Search
CPC ................................................. G06Q 30/0601
See application file for complete search history.

(56) References Cited

FOREIGN PATENT DOCUMENTS

| JP | 2002-112222 A | 4/2002 |
|---|---|---|
| JP | 2003-46974 A | 2/2003 |

(Continued)

OTHER PUBLICATIONS

Marwick, Alice E. "Instafanne: Luxury selfies in the attention economy." Public culture 27.1 (75) (2015): 137-160.*

(Continued)

*Primary Examiner* — Kathleen Palavecino
(74) *Attorney, Agent, or Firm* — Nakanishi IP Associates, LLC

(57) ABSTRACT

A server communicable with a submitter terminal and a purchaser terminal delivers, to a purchaser, a self-shot video responding to a request from the purchaser in a system in which the submitter submits a self-shot video as a product and the purchaser purchases the product. The server includes a receiver that receives product information from the submitter terminal, a sender that sends the received product information to the purchaser terminal, a receiver that receives a purchase instruction from the purchaser terminal displaying the product information, a receiver that receives request information for self-shooting from the purchaser terminal, a sender that sends the received request information to the submitter terminal, a receiver that receives a self-shot video shot based on the displayed request information from the submitter terminal, and a sender that sends the received self-shot video to the purchaser terminal.

8 Claims, 13 Drawing Sheets

(51) Int. Cl.
*G06Q 30/06* (2012.01)
*G06Q 50/10* (2012.01)
*H04L 12/58* (2006.01)

(56) References Cited

FOREIGN PATENT DOCUMENTS

| JP | 2010-211513 A | 9/2010 |
|----|---------------|--------|
| WO | 2015/056687 A1 | 4/2015 |

OTHER PUBLICATIONS

International Search Report issued in PCT/JP2017/001655 dated Feb. 14, 2017 with English Translation (5 pages).
Written Opinion of International Searching Authority issued in 2017/001655 dated Feb. 14, 2017 (3 pages).

* cited by examiner

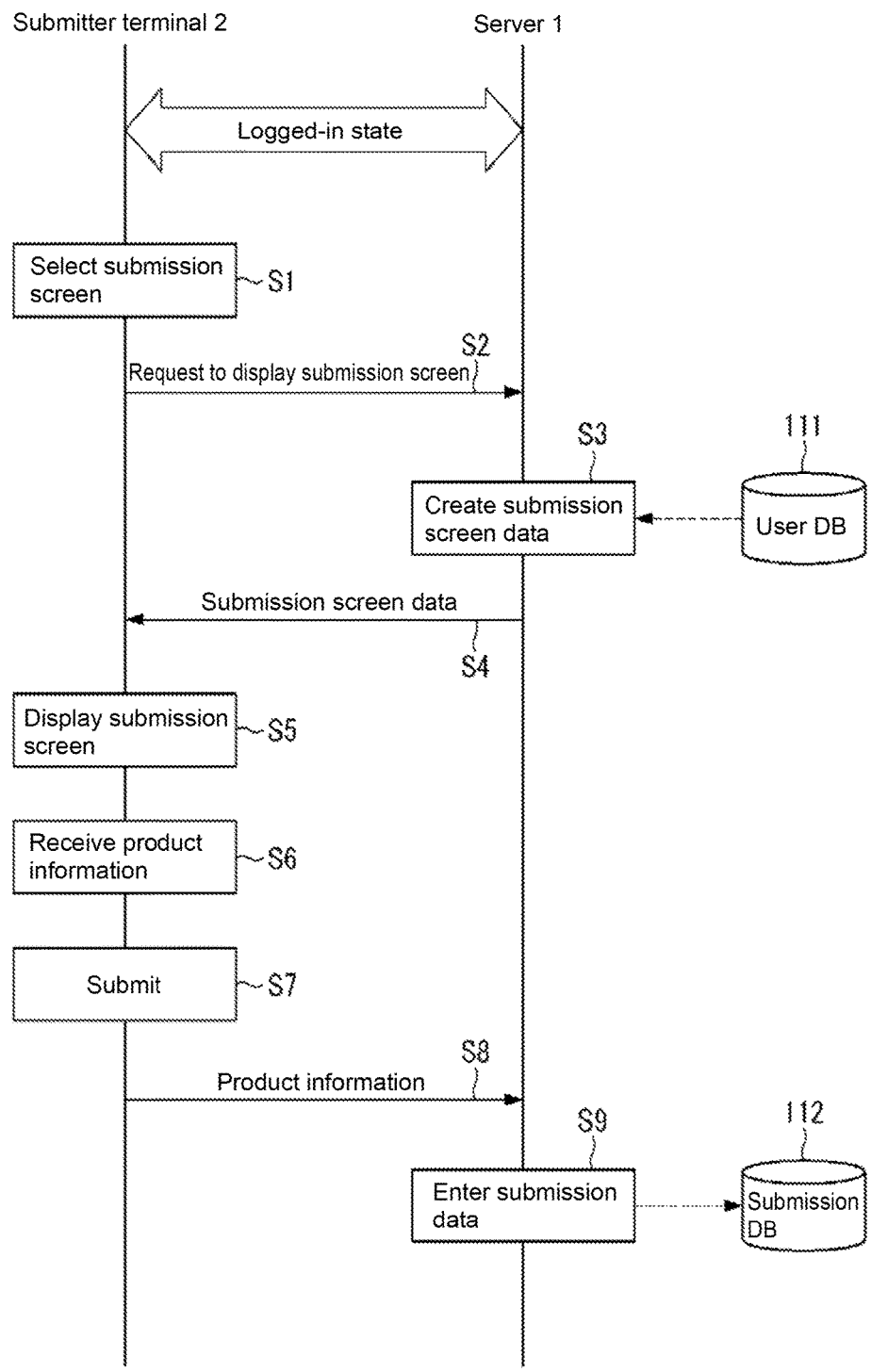

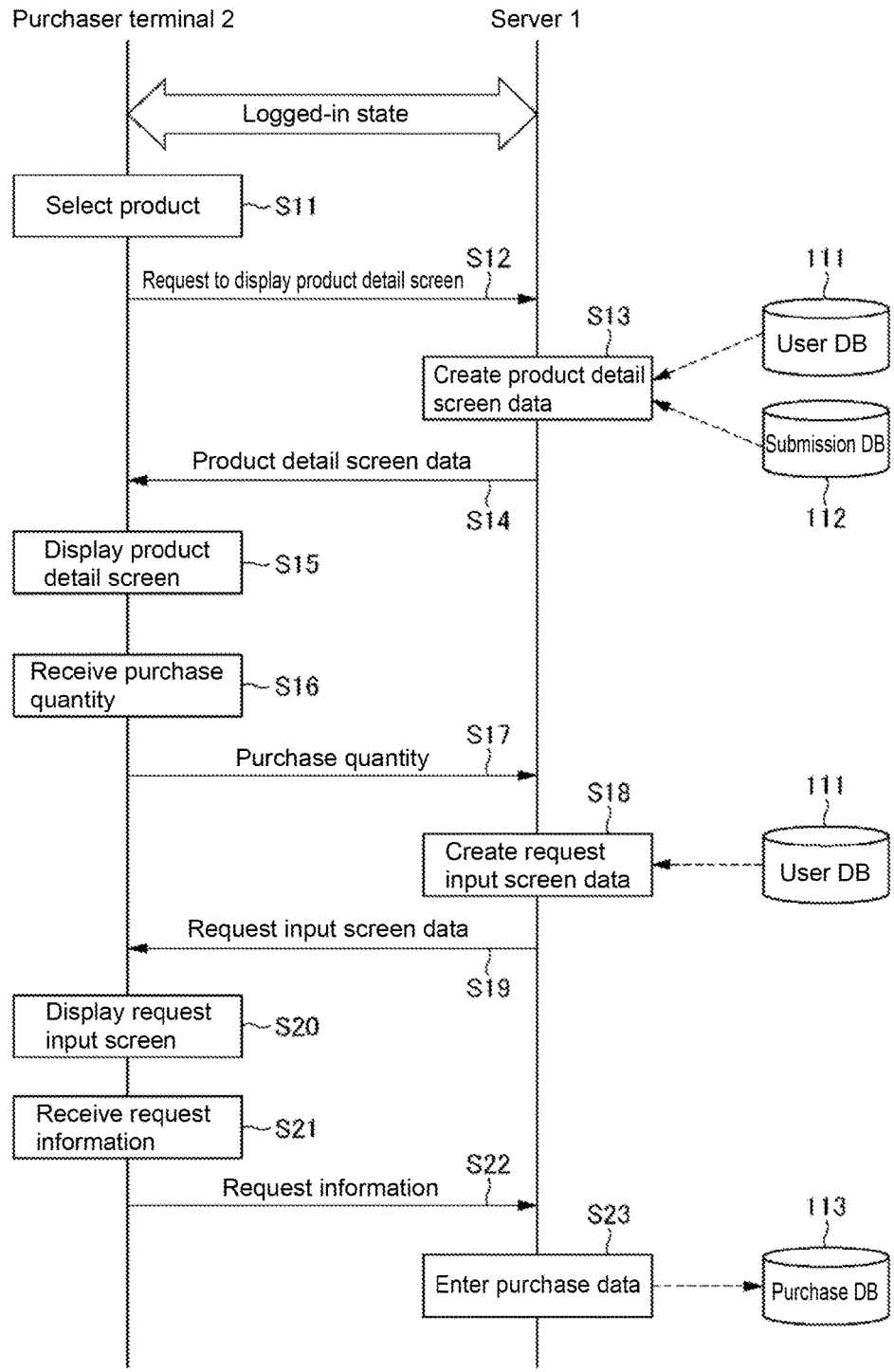

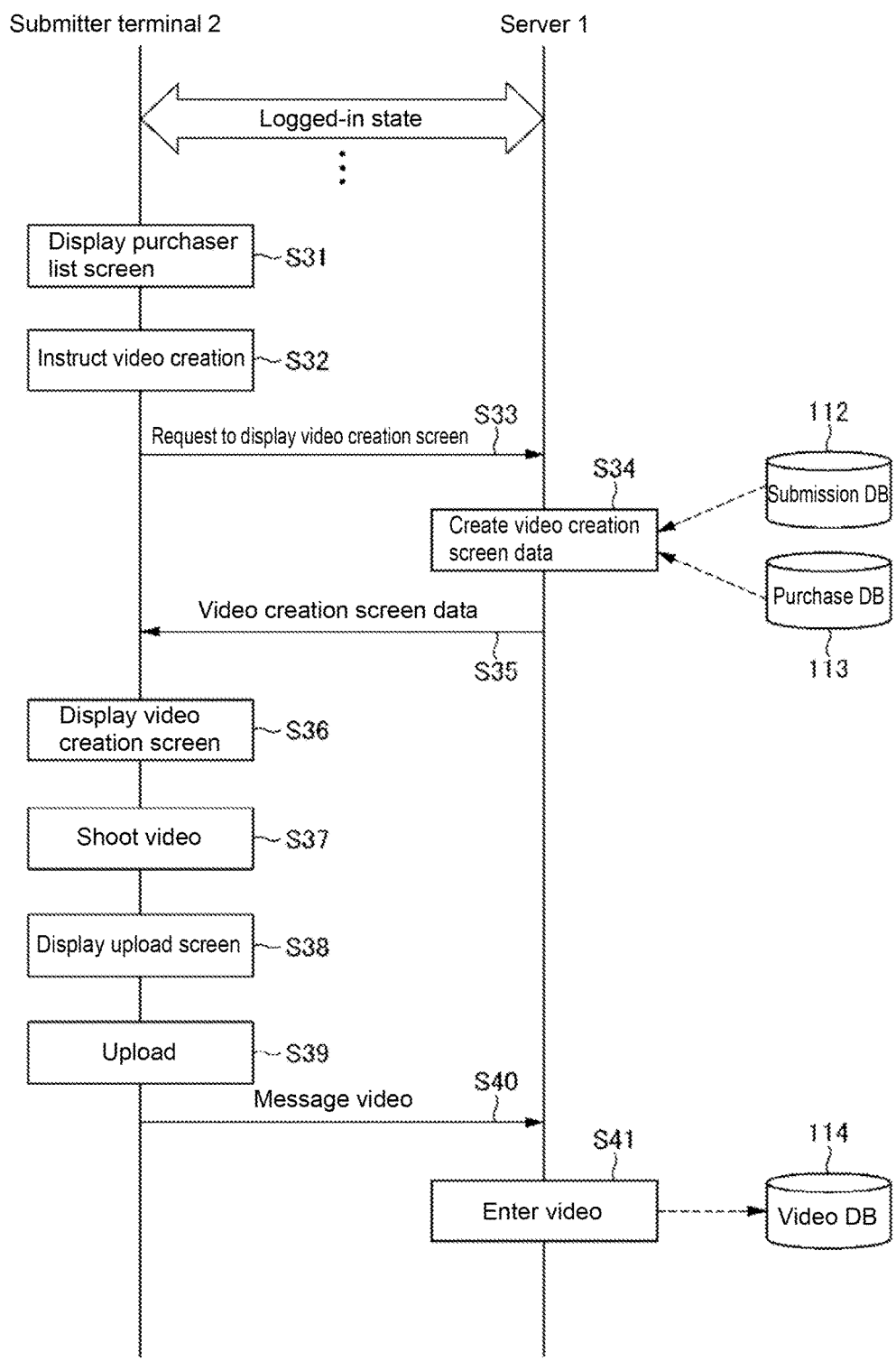

FIG. 10

O41:
- 10-sec personal message from artist A
- Dec 1 to 15, 2015
- Creation deadline: Dec 31, 2015
- No. of purchasers: 97
- Sales ¥194,000

I042:

| Purchase ID | Purchaser icon | Name | Date of purchase |
|---|---|---|---|
| B0001 | | User A | Dec 1, 2015 |
| B0002 | | User B | Dec 1, 2015 |
| B0003 | | User C | Dec 1, 2015 |
| B0004 | | User D | Dec 1, 2015 |
| B0005 | | User E | Dec 2, 2015 |
| B0006 | | User F | Dec 2, 2015 |
| B0007 | | User G | Dec 2, 2015 |
| B0008 | | User H | Dec 3, 2015 |
| B0009 | | User I | Dec 3, 2015 |
| B00010 | | User J | Dec 4, 2015 | ved
MESSAGE VIDEO DELIVERY APPARATUS, MESSAGE VIDEO DELIVERY METHOD, AND MESSAGE VIDEO DELIVERY PROGRAM

BACKGROUND OF INVENTION

Field of the Invention

The present invention relates to a technique for delivering a message video in communication between two parties, and more particularly to a message video delivery apparatus, a message video delivery method, and a message video delivery program for delivering a personal message video through a communication network.

Background Art

Artists nowadays send messages to a large number of unspecified fans not only through concerts, broadcasts, and magazines but also through blogs and social networking services (SNS), enabling interactive communication between artists and their fans.

SUMMARY OF INVENTION

Technical Problem

However, such messages and communications are not private and can be observed by other fans. Although certain events (e.g., meet-and-greets) allow one-to-one interactive communication, such events have restrictions on time and locations and cannot be attended by everyone.

One or more aspects of the present invention are directed to a message video delivery apparatus, a message video delivery method, and a message video delivery program used in delivery of a message video created by a first user to a second user, such as when an artist delivers a message video to each individual fan for delivering, to the second user, a personal message video reflecting requests from the second user and enabling private communication satisfying both the first user and the second user.

Solution to Problem

In response to the above issue, a message video delivery apparatus according to one aspect of the present invention is communicable with a submitter terminal held by a submitter and a purchaser terminal held by a purchaser through a network. The message video delivery apparatus is a server included in a computer system in which the submitter submits a self-shot video with voice as a product and the purchaser purchases the product. The server delivers, to the purchaser, the self-shot video with voice responding to a request from the purchaser. The message video delivery apparatus includes a product information receiver that receives product information including at least a description of a submitted product, a sales period and a sales quantity of the product, and a record time of a video from the submitter terminal, a product information sender that sends the product information received by the product information receiver to the purchaser terminal, a purchase instruction receiver that receives, from the purchaser terminal displaying the product information sent from the product information sender, a purchase instruction for a product displayed on the purchaser terminal, a request information receiver that receives, from the purchaser terminal that has sent the purchase instruction, request information including a request for voice and an image to be self-shot for the purchased product, a request information sender that sends the request information received by the request information receiver to the submitter terminal held by the submitter that has submitted the purchased product, a self-shot video receiver that receives, from the submitter terminal displaying the request information sent from the request information sender, a self-shot video with voice shot based on the displayed request information, and a self-shot video sender that sends the self-shot video with voice received by the self-shot video receiver to the purchaser terminal that has sent the purchase instruction.

A message video delivery apparatus according to another aspect of the present invention is communicable with a submitter terminal held by a submitter and a purchaser terminal held by a purchaser through a network. The message video delivery apparatus is a server included in a computer system in which the submitter submits a self-shot video with voice as a product and the purchaser purchases the product. The server delivers, to the purchaser, a self-shot video responding to a request from the purchaser. The message video delivery apparatus includes a submission data storage unit that stores submission data including, in a manner associated with one another, the submission ID for uniquely identifying a product submitted by the submitter, a submitter user ID for uniquely identifying the submitter of the product, and product information including at least a description of the submitted product, a sales period and a sales quantity of the product, and a record time of a video, a purchase data storage unit that stores purchase data including, in a manner associated with one another, a purchase ID for uniquely identifying a purchase of a product by the purchaser, a submission ID of the purchased product, a purchaser user ID for uniquely identifying the purchaser of the product, and request information including a request for voice and an image to be self-shot by the submitter for the purchased product, a video data storage unit that stores video data including, in a manner associated with each other, the purchase ID and a message video that is a self-shot video shot by the submitter, a product information receiver that receives, from the submitter terminal, the product information input by the submitter, a submission data entry unit that creates the submission data based on the product information received by the product information receiver and the submitter user ID of the submitter that has input the product information, and enter the created submission data into the submission data storage unit, a first search request receiver that receives a first search request associated with the product information from the purchaser terminal, a product information sender that retrieves submission data associated with the first search request received by the first search request receiver from the submission data entered in the submission data storage unit, and sends the product information included in the retrieved submission data to the purchaser terminal that has sent the first search request, a purchase instruction receiver that receives a purchase instruction for the product input by the purchaser from the purchaser terminal displaying the product information sent from the product information sender; a request information receiver that receives, from the purchaser terminal that has sent the purchase instruction, the request information including a request for voice and an image to be self-shot for the purchased product, a purchase data entry unit that creates the purchase data based on the request information received by the request information receiver, the submission ID of the purchased product, and the purchaser user ID, and enters the created purchase data into the purchase data storage unit, a second search request receiver that receives a second search request associated with the purchase data from the submitter terminal, a request information sender that retrieves purchase data associated with the second search request received by the second search request receiver from the purchase data entered in the purchase data storage unit, and sends the request information included in the retrieved purchase data to the submitter terminal, a self-shot video receiver that receives, from the submitter terminal displaying the request information sent from the request information sender, a self-shot video with voice shot based on the displayed request information, a video data entry unit that creates the video data based on the self-shot video with voice received by the self-shot video receiver and the purchase ID in the purchase data retrieved by the request information sender, and enters the created video data into the video data storage unit, an output request receiver that receives an output request for the video data from the purchaser terminal, and a self-shot video sender that retrieves video data associated with the output request received by the output request receiver from the video data entered in the video data storage unit, and sends the self-shot video with voice included in the retrieved video data to the purchaser terminal that has sent the output request.

A message video delivery method according to still another aspect of the present invention is used in a computer system in which a submitter submits a self-shot video with voice as a product and a purchaser purchases the product. The computer system includes a submitter terminal held by the submitter, a purchaser terminal held by the purchaser, and a server communicable with the submitter terminal and the purchaser terminal through a communication network. The server delivers, to the purchaser, a self-shot video with voice responding to a request from the purchaser. The message video delivery method includes receiving product information including at least a description of a submitted product, a sales period and a sales quantity of the product, and a record time of a video from the submitter terminal, sending the received product information to the purchaser terminal, receiving, from the purchaser terminal displaying the sent product information, a purchase instruction for a product displayed on the purchaser terminal, receiving, from the purchaser terminal that has sent the purchase instruction, request information including a request for voice and an image to be self-shot for the purchased product, sending the received request information to the submitter terminal held by the submitter that has submitted the purchased product, receiving, from the submitter terminal displaying the sent request information, a self-shot video with voice shot based on the displayed request information, and sending the received self-shot video with voice to the purchaser terminal that has sent the purchase instruction.

A message video delivery program according to still another aspect of the present invention is for delivering, to a purchaser, a self-shot video with voice responding to a request from the purchaser in a computer system in which a submitter submits a self-shot video with voice as a product and the purchaser purchases the product. The computer system includes a submitter terminal held by the submitter, a purchaser terminal held by the purchaser, and a server communicable with the submitter terminal and the purchaser terminal through a communication network. The message video delivery program causes the server to implement receiving product information including at least a description of a submitted product, a sales period and a sales quantity of the product, and a record time of a video from the submitter terminal, sending the received product information to the purchaser terminal, receiving, from the purchaser terminal displaying the sent product information, a purchase instruction for a product displayed on the purchaser terminal, receiving, from the purchaser terminal that has sent the purchase instruction, request information including a request for voice and an image to be self-shot for the purchased product, sending the received request information to the submitter terminal held by the submitter that has submitted the purchased product, receiving, from the submitter terminal displaying the sent request information, a self-shot video with voice shot based on the displayed request information, and sending the received self-shot video with voice to the purchaser terminal that has sent the purchase instruction.

The above aspects of the present invention allow the first user to create a personal message video reflecting requests from the second user and deliver the created message video to the second user to enable private communication satisfying both the first user and the second user.

BRIEF DESCRIPTION OF THE DRAWINGS

FIG. 3 is a flowchart showing a product submission process performed by the message video delivery system according to the embodiment of the present invention.

FIG. 4 is a flowchart showing a purchase process performed by the message video delivery system according to the embodiment of the present invention.

FIG. 5 is a flowchart showing a video creation support process and a video entry process performed by the message video delivery system according to the embodiment of the present invention.

FIG. 10 is an example of a purchaser list screen used in the message video delivery system according to the embodiment of the present invention.

DETAILED DESCRIPTION

Embodiments of the present invention will now be described in detail with reference to the drawings.

Configuration of Message Video Delivery System

Figure 1:
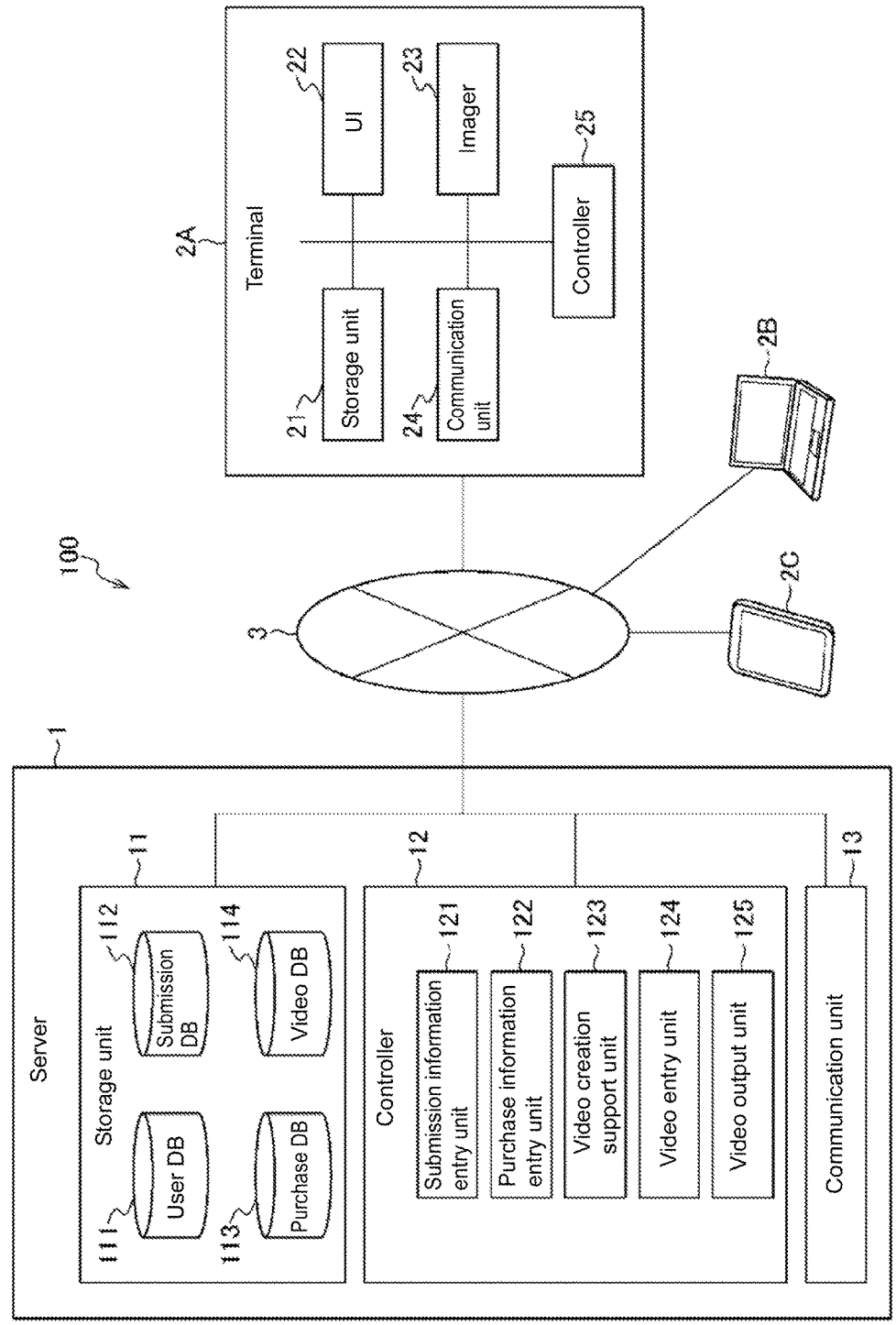
FIG. 1 is a schematic block diagram of a message video delivery system according to one embodiment of the present invention.

FIG. 1 is a schematic block diagram of a message video delivery system 100 according to one embodiment of the present invention. The message video delivery system 100 is a computer system for assisting a service (hereafter referred to as a message video delivery service), in which a first user (a person who provides video messages, such as an artist, hereafter referred to as a submitter) sells a self-shot message video as a product, and a second user (a person who purchases a video message, such as a fan, hereafter referred to as a purchaser) sends a request to the first user and purchases the product. The first user then creates a message video reflecting the request from the second user and delivers the created message video to the second user.

The message video delivery service is a membership service, for which the first user, who is the submitter, and the second user, who is the purchaser, are the members of the service. A self-shot message video in the present embodiment refers to a message video that shows the first user as a video subject and may be shot by the first user or a third person (e.g., a person relevant to an artist, such as an assistant).

As shown in FIG. 1, the message video delivery system 100 is owned by a corporation that provides the message video delivery service. The message video delivery system 100 includes a message video delivery apparatus (hereafter referred to as a server) 1, which plays a central role in the message video delivery service, user terminals 2A, 2B, 2C, and other terminals (hereafter collectively referred to as terminals 2), which are held by the users of the message video delivery service (the submitter and the purchaser), and a communication network 3, which is for example the Internet enabling communication between the server 1 and the terminal 2.

The server 1 includes a storage unit 11, which includes, for example, a hard disk drive and stores data managed by the message video delivery system 100, a controller 12, which includes, for example, a central processing unit (CPU) and a memory and performs various processes according to the present embodiment described below (a product submission process, a purchase process, a video creation support process, a video entry process, and a video output process) by controlling the storage unit 11, transferring data, performing arithmetic operations, and temporally storing data, and a communication unit 13, which sends and receives data to and from the terminal 2 through the communication network 3.

The storage unit 11 specifically includes a user database (hereafter a user DB) 111, a submission database (hereafter a submission DB) 112, a purchase database (hereafter a purchase DB) 113, and a video database (hereafter a video DB) 114. FIGS. 2A to 2D are schematic diagrams showing the data configurations of the user DB, the submission DB, the purchase DB, and the video DB.

Figure 2A:
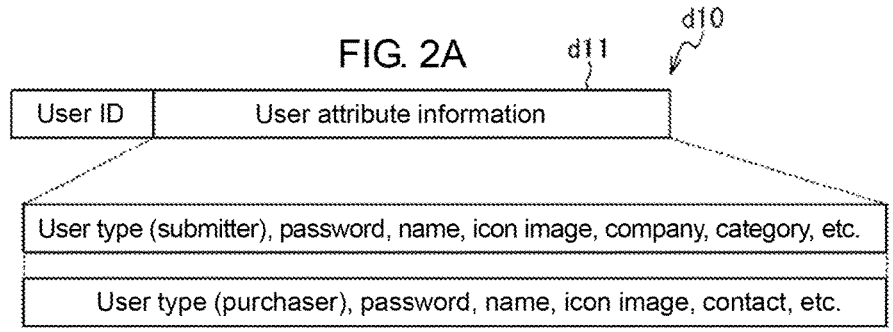
FIGS. 2A, 2B, 2C, and 2D are schematic diagrams showing the data configurations of a user DB, a submission DB, a purchase DB, and a video DB in the message video delivery system according to the embodiment of the present invention.

The user DB 111 is a database storing attribute information for member users of the message video delivery service (a submitter and a purchaser). As shown in FIG. 2A, the user DB 111 stores user data d10 including a user ID for uniquely identifying the user and user attribute information d11 in a manner associated with each other. The user type is a flag indicating that the user is a submitter or a purchaser. In the present embodiment, the user attribute information d11 for a submitter includes a user type (submitter), a password, a name, an icon image, a company that the user belongs to, a category, and other items. The user attribute information for a purchaser includes a user type (purchaser), a password, a name, an icon image, a contact, and other items. The user data d10 is information that is entered by the user when the user subscribes to the message video delivery service. The user attribute information included in the user data d10 is updated as appropriate by the user.

Figure 2B:
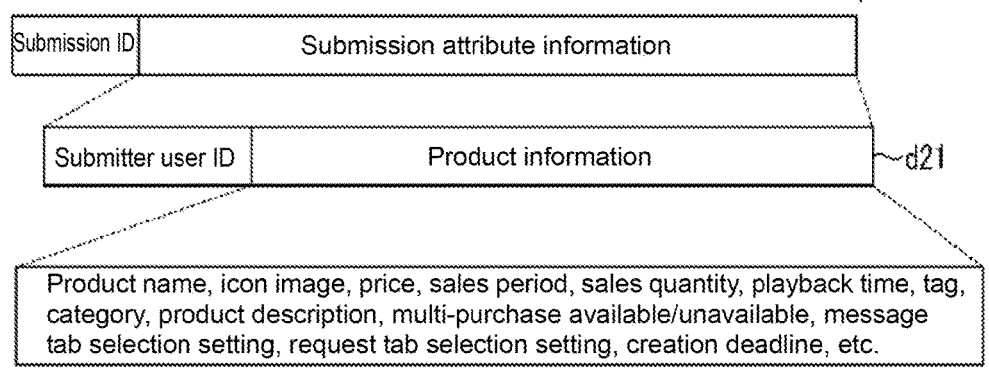

The submission DB 112 is a database storing information about a message video submitted by the submitter (hereafter also referred to as a product). As shown in FIG. 2B, the submission DB 112 stores submission data d20 including a submission ID for uniquely identifying the submitted product and submission attribute information in a manner associated with each other. More specifically, the submission attribute information includes the user ID of the submitter who has submitted the product and product information d21. In the present embodiment, the product information d21 includes a product name, an icon image, a price, a sales period, a sales quantity, a playback time, tags, a category, product description, a multiple-purchase flag, a message tab selection setting, a request tab selection setting, and a creation deadline. The submission data d20 is entered into the submission DB 112 when the submitter submits a product, and the product submission process (described later) is performed. The submission data d20 contains information about the submitter and his or her product.

Figure 2C:
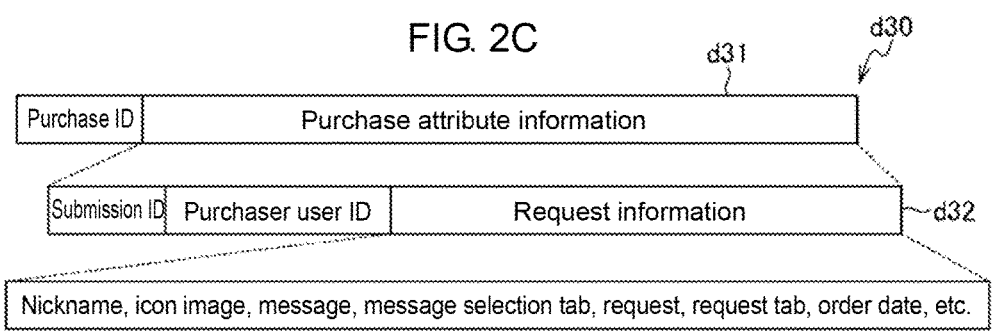

The purchase DB 113 is a database storing information about requests for a product purchased by the purchaser. As shown in FIG. 2C, the purchase DB 113 stores purchase data d30 including a purchase ID for uniquely identifying an order placed by the purchaser and purchase attribute information d31 in a manner associated with each other. More specifically, the purchase attribute information d31 includes the submission ID of the purchased product, the user ID of the purchaser, and request information d32. In the present embodiment, the request information d32 includes a nickname, an icon image, a message, a message selection tab, requests, a request tab, and an order date. The purchase data d30 is entered into the purchase DB 113 when the purchaser purchases a product, and the purchase process (described later) is performed. The purchase data d30 contains information about the product purchased by the purchaser and requests for the purchased product.

Figure 2D:
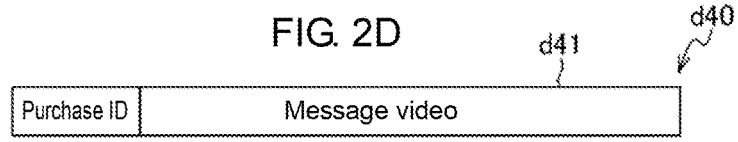

The video DB 114 is a database storing message videos shot by the submitter. As shown in FIG. 2D, the video DB 114 stores video data d40 including the purchase ID and a message video d41 shot by the submitter in a manner associated with each other. The video data d40 is entered into the video DB 114 when the video entry process (described later) is performed. The video data d40 contains information representing a video created under each purchase ID for one product or in other words for a different purchaser for the same product.

The controller 12 can be divided into sections with primary functions, which are a submission information entry unit 121 for implementing the product submission process, a purchase information entry unit 122 for implementing the purchase process, a video creation support unit 123 for implementing the video creation support process, a video entry unit 124 for implementing the video entry process, and a video output unit 125 for implementing the video output process.

The submission information entry unit 121 performs the product submission process to create the submission data d20 based on the product information d21 input by the submitter, and enter the created submission data d20 into the submission DB 112.

The purchase information entry unit 122 performs the purchase process to create the purchase data d30 based on the request information d32 input by the purchaser, and enter the created purchase data d30 into the purchase DB 113.

The video creation support unit 123 performs the video creation support process, which is held by the submitter for shooting a message video, to display the request information d32 from the purchaser on the terminal 2 held by the submitter.

The video entry unit 124 performs the video entry process to create the video data d40 using the message video d41 shot by the submitter, and enter the created video data d40 into the video DB 114.

The video output unit 125 performs the video output process to output the message video d41 ordered by the purchaser to the terminal 2. In the present embodiment, the message video is output in the form of streaming playback by the server 1, the message video d41 downloadable to the terminal 2 and played back on the terminal 2, or a predetermined information storage medium storing the message video d41, such as a compact disc (CD) and a digital versatile disc (DVD), delivered to the purchaser.

The server 1 serves not only as an application server and a database server described above but also serves as a web (world wide web) server (not shown), and can send and receive information to and from the terminal 2 through the web. The server 1 may be a physically single apparatus or a system including multiple apparatuses connected to one another through a network. In the server 1 including multiple apparatuses, the apparatuses may be placed at one place altogether or distributed at different places.

Programs for implementing the processes according to the present embodiment (the product submission process, the purchase process, the video creation support process, the video entry process, and the video output process) are stored in a main storage device such as the above memory or an auxiliary storage device such as a hard disk drive. The programs may be recorded on a storage medium readable by a computer, such as a hard disk drive, a flexible disk, a CD, a DVD, and a Blu-ray (registered trademark) disc (BD), and may be distributed through the communication network.

The terminal 2 is an information terminal, such as a smartphone, a tablet terminal, and a personal computer (PC). The terminal 2 includes a storage unit 21, a user interface (UI) 22, an imager 23, a communication unit 24, and a controller 25. In the example described in detail below, the terminal 2 is a smartphone.

The storage unit 21 includes, for example, a flash memory, and stores data and programs used in control by the controller 25. The storage unit 21 according to the present embodiment has software installed, including browser software and terminal application software for using the message video delivery service (hereafter referred to as a terminal application). The terminal 2 held by the submitter also stores message videos shot by the submitter. The terminal 2 held by the purchaser stores, for example, downloaded message videos.

The UI 22 serves as both an input unit and an output unit of the information terminal. The UI 22 receives an input operation performed by a user, and outputs a result of processing by the controller 25 in response to the input operation. The UI 22 in a smartphone includes a touch panel, which functions also as a display screen, a microphone, and a speaker.

The imager 23 has the video camera function, and can shoot a video containing voice. In the present embodiment, the submitter uses this function to shoot a self-shot video with his or her terminal 2. Thus, the imager 23 may be eliminated from the terminal 2 held by the purchaser.

The communication unit 24 sends and receives data to and from the server 1 using, for example, the browser software or the terminal application through the communication network 3.

The controller 25 includes, for example, a CPU and a memory, and performs the processing on the terminal 2 in the message video delivery system 100 by controlling the storage unit 21, transferring data, performing arithmetic operations, and temporarily storing data. In the present embodiment, the processing on the terminal 2 in the message video delivery system 100 is implementable when the terminal 2 has at least either the browser software or the terminal application installed.

Operation of Message Video Delivery System

The operation of the message video delivery system 100 according to the present embodiment will now be described with reference to FIGS. 3 to 13. FIGS. 3 to 6 are sequence diagrams showing the processes performed by the message video delivery system 100. FIGS. 7 to 13 are example screens on the terminal 2 in the message video delivery system 100. Each process shown in FIGS. 3 to 6 is performed by the message video delivery system 100 after successful authentication of users (a submitter and a purchaser) in the message video delivery system 100 (in a logged-in state after successful authentication by input of the user ID and the password). Although the processing on the terminal 2 in the processes performed by the message video delivery system 100 may be implemented with the browser function as described above, the processing in FIGS. 3 to 12 is implementable with the function of the terminal application installed on the terminal 2.

Submission Process

The product submission process performed by the message video delivery system 100 will now be described with reference to FIG. 3. FIG. 3 is a sequence diagram showing the product submission process performed by the message video delivery system 100.

The submitter selects a submission screen on the terminal 2 held by the submitter (step S1). For example, the submitter selects "Submit" from the menu on the initial screen of the message video delivery service displayed on the terminal 2. As a result, a request to display a submission screen is sent from the terminal 2 held by the submitter to the server 1 (step S2).

When receiving the request to display the submission screen from the terminal 2 held by the submitter, the server 1 creates submission screen data based on the user data d10 of the submitter stored in the user DB 111 (step S3), and sends the submission screen data to the terminal 2 held by the submitter (step S4). The submission screen data includes an icon image and a category of the submitter.

Figure 7:
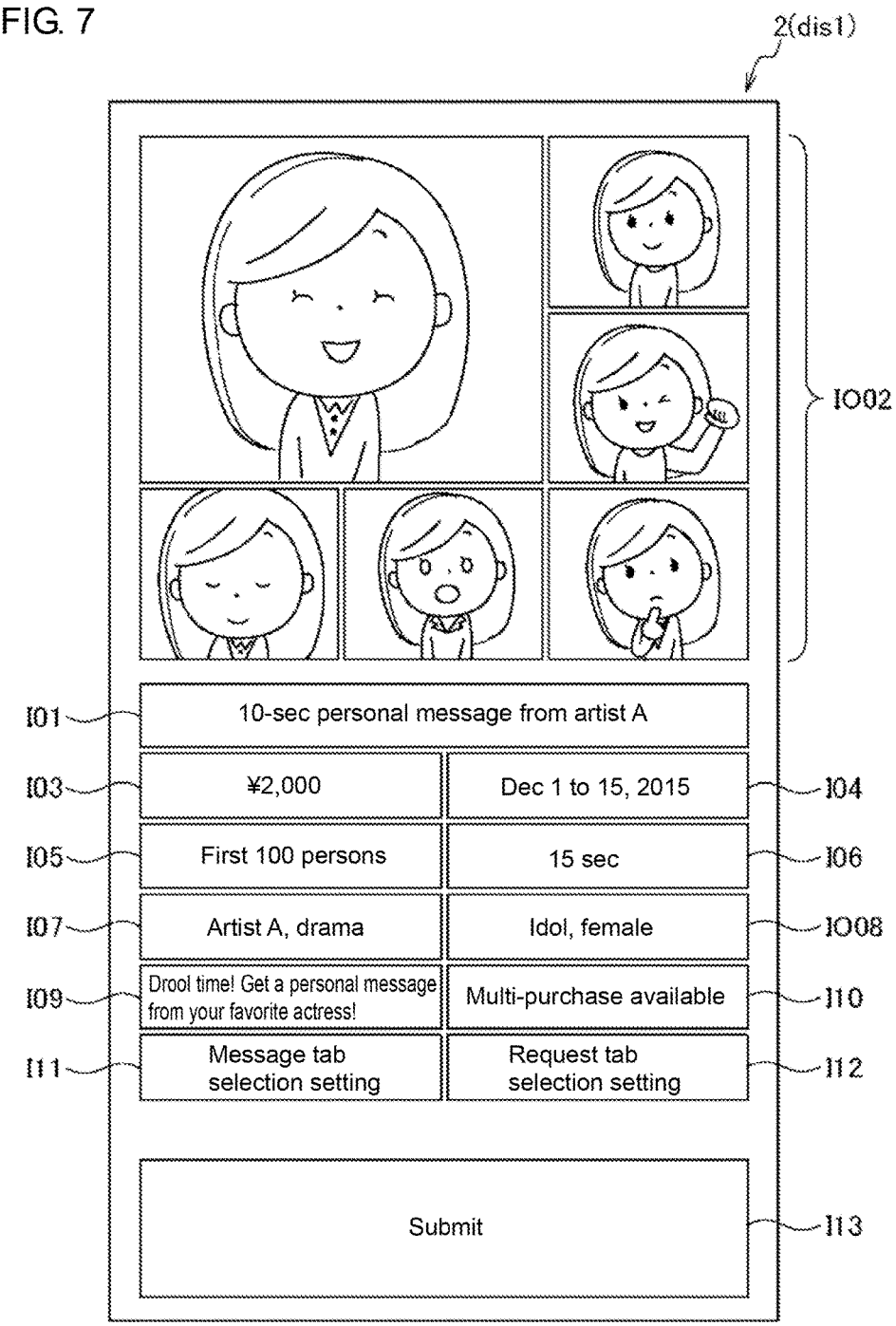
FIG. 7 is an example of a submission screen used in the message video delivery system according to the embodiment of the present invention.

When receiving the submission screen data, the terminal 2 held by the submitter displays a submission screen dis1 based on the received submission screen data (step S5). FIG. 7 shows an example of the submission screen dis1.

The submitter inputs the items on the submission screen dis1, or specifically inputs the product information d21 (step S6). More specifically, the submitter inputs a product name I01 (e.g., 10-second personal message from artist A), an icon image IO02 (e.g., multiple images of the artist A), a price I03 (e.g., 2,000 yen), a sales period I04 (e.g., Dec. 1 to 15, 2015), a sales quantity I05 (e.g., 100 persons), a playback time of the message video I06 (e.g., 15 seconds), tags I07 used in search (e.g., artist A and drama), a category IO08 (e.g., idol and female), and product description I09 (e.g., Drool time! Get a personal message from your favorite actress!), and sets a multiple-purchase flag I10 indicating whether one user may purchase a multiple quantity (e.g., multiple-purchase available), a message tab selection I11 allowing the purchaser to select one of multiple options (e.g., four options: "I support you.", "I love you.", "Try harder.", and "You are pretty"), and a request tab selection I12 allowing the purchaser to select one of multiple options (e.g., four options: "Costume request", "Pose request", "Phrase request", and "Sony request").

Although the icon image of the submitter stored in the user DB 111 appears as the icon image IO02 by default, the icon image may be replaced with a different image by a replacement operation performed by the submitter. Although the category of the submitter stored in the user DB 111 appears as the category IO08 by default, the category may be changed to a different category by input by the submitter.

When the submitter inputs the product information d21 and then presses a submit button I13 (step S7), the terminal 2 held by the submitter sends the input product information d21 to the server 1 (step S8).

When receiving the product information d21, the server 1 creates the submission data d20 based on the received product information d21 and the user ID of the submitter, and enters the created submission data d20 into the submission DB 112 (step S9).

Although the product submission process shown in FIG. 3 is performed using the function of the terminal application in the terminal 2, the browser function of the terminal 2 may be used instead to perform the product submission process. In this case, the server 1 does not send the submission screen data to the terminal 2 held by the submitter but creates the submission screen based on the submission screen data, and sends the created submission screen to the terminal 2 held by the submitter in step S4.

The product submission process according to the present embodiment allows the submitter to determine any conditions including the price I03, the sales period I04, the sales quantity I05, and the playback time I06 as described above. The submitter may thus create a message video reflecting requests from the purchaser within the coverage of the product planned by the submitter. In other words, the submitter can set the framework (direction) of a product. Additionally, the submitter may set any options including the message tab selection setting and the request tab setting. The submitter can thus reflect his or her preference to a certain degree in the message video to respond to the message and the request.

Purchase Process

The purchase process performed by the message video delivery system 100 will now be described with reference to FIG. 4. FIG. 4 is a sequence diagram showing the purchase process performed by the message video delivery system 100.

The purchaser instructs a product selection using the terminal 2 held by the purchaser (step S11). For example, a search function prepared in the message video delivery service (e.g., a product name and a category) is used to select a desired product from a large number of products. As a result, a request to display a detail screen of the selected product is sent from the terminal 2 held by the purchaser to the server 1 (step S12).

When receiving the request to display a detail screen of the product from the terminal 2 held by the purchaser, the server 1 creates product detail screen data by retrieving the relevant submission data d20 from the submission DB 112 based on the submission ID of the selected product and retrieving the relevant user data d10 from the user DB 111 based on the user ID of the submitter of the selected product (step S13), and then sends the product detail screen data to the terminal 2 held by the purchaser (step S14). The product detail screen data includes the icon image of the submitter, the company that the submitter belongs to, the product name, the product description, the price, the sales period, the sales quantity, and the playback time.

Figure 8:
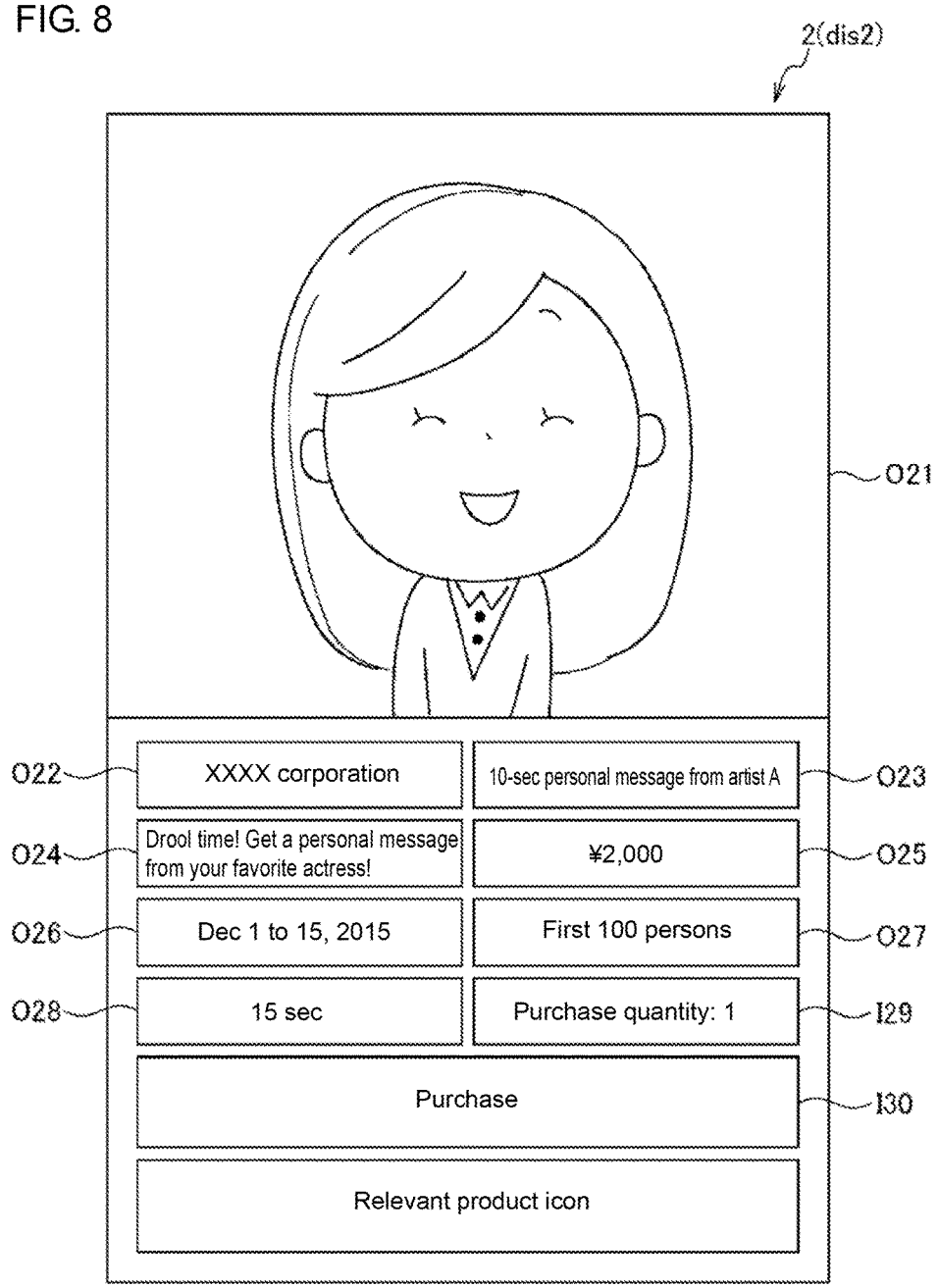
FIG. 8 is an example of a product detail screen used in the message video delivery system according to the embodiment of the present invention.

When receiving the product detail screen data, the terminal 2 held by the purchaser displays a product detail screen dis2 based on the received product detail screen data (step S15). FIG. 8 shows an example of the product detail screen dis2. More specifically, the product detail screen dis2 displays an icon image I21 of the submitter of the selected product (e.g., an image of the artist A), a company O22 that the submitter belongs to (e.g., XXXX corporation), a product name O23 (e.g., 10-second personal message from artist A), product description O24 (e.g., Drool time! Get a personal message from your favorite actress!), a price O25 (e.g., 2,000 yen), a sales period O26 (e.g., Dec. 1 to 15, 2015), a sales quantity O27 (e.g., 100 persons), and a playback time O28 (e.g., 15 seconds). The product detail screen dis2 shown in FIG. 8 displays the product input in the submission screen dis1 shown in FIG. 7.

When the purchaser inputs the purchase quantity I29 (e.g., 1) in the product detail screen dis2 and then presses a purchase button I30 (step S16), the terminal 2 held by the purchaser sends the input purchase quantity to the server 1 (step S17). When the submitter has disabled the multiple-purchase in the product submission process (sets the multiple-purchase flag I10 in FIG. 7 to "unavailable"), the purchase quantity accepts no value other than 1.

When receiving the purchase quantity, the server 1 creates request input screen data by retrieving the user data d10 from the user DB 111 based on the user ID of the purchaser (step S18), and sends the request input screen data to the terminal 2 held by the purchaser (step S19). The request input screen data includes an icon image and the name of the purchaser (in kanji or kana).

Figure 9:
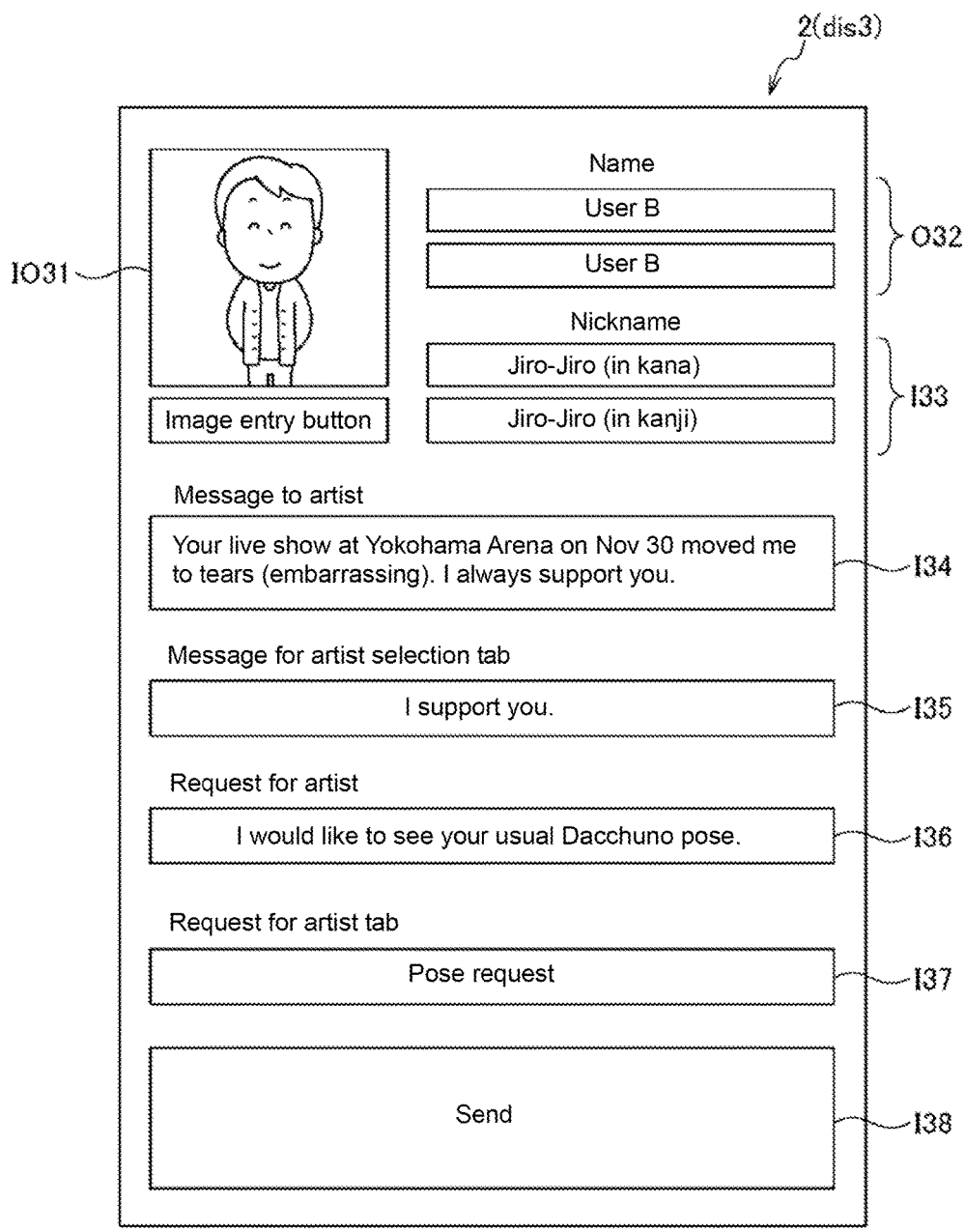
FIG. 9 is an example of a request input screen used in the message video delivery system according to the embodiment of the present invention.

When receiving the request input screen data, the terminal 2 held by the purchaser displays a request input screen dis3 based on the received request input screen data (step S20). FIG. 9 shows an example of the request input screen dis3. More specifically, the request input screen dis3 displays an icon image IO31 of the purchaser (e.g., an image of a user B) and a name O32 (e.g., User B). The request input screen dis3 shown in FIG. 9 is a screen appearing when the user B purchases the product displayed on the product detail screen dis2 shown in FIG. 8.

When the purchaser inputs a nickname (in kanji or kana) I33 (e.g., Jiro-Jiro), a message I34 (e.g., Your live show at Yokohama Arena on 30 November moved me to tears (embarrassing). I always support you.), a message selection tab I35 (e.g., I support you.), a request I36 (e.g., I would like to see your usual Dacchuno pose.), and a request tab I37 (e.g., Pose request) in the request input screen dis3, and then presses a send button I38 (step S21), the terminal 2 held by the purchaser sends the request information d32 to the server 1 (step S22).

Although the icon image stored in the user DB 111 appears as the icon image IO31 by default, the icon image may be replaced with a different image by an icon replacement operation performed by the purchaser. The message selection tab I35 and the request tab I37 are selected from the message selection tabs and the request tabs set by the submitter in the product submission process (the message tab selection I11 and the request tab selection I12 shown in FIG. 7).

When receiving the request information d32, the server 1 creates the purchase data d30 based on the received request information d32, the user ID of the purchaser, and the submission ID of the purchased product, and enters the created purchase data d30 into the purchase DB 113.

Although the processing described with reference to FIG. 4 is performed for a single quantity purchase as shown in FIG. 8, the processing in steps S18 to S23 is performed multiple times for a multiple quantity. As a result, sets of purchase data d30 are entered into the purchase DB 113 in accordance with the purchased quantity.

Although the purchase process shown in FIG. 4 is performed using the function of the terminal application in the terminal 2, the browser function of the terminal 2 may be used instead to perform the purchase process. In this case, the server 1 creates the product detail screen based on the product detail screen data and sends the created product detail screen to the terminal 2 held by the purchaser in step S13, and creates the request input screen based on the request input screen data and sends the created request input screen to the terminal 2 held by the purchaser in step S18.

The purchase process according to the present embodiment allows the purchaser to input the nickname I33, the message I34 for the submitter, the message selection tab I35, the request I36 for the submitter, and the request tab I37 as described above. The purchaser may thus deliver, to the submitter, various requests for the voice and the image of the self-shot video. In other words, the purchaser may request creation of a message video reflecting his or her preference.

Video Creation Support Process and Video Entry Process

The video creation support process and the video entry process performed by the message video delivery system 100 will now be described with reference to FIG. 5. FIG. 5 is a sequence diagram showing the video creation support process and the video entry process performed by the message video delivery system 100.

The submitter displays a purchaser list screen on the terminal 2 held by the submitter (step S31), and then instructs creation of a video (step S32). As a result, a request is sent to display a video creation screen from the terminal 2 held by the submitter to the server 1 (step S33).

For example, when a product (product for which a video is to be shot) is selected on a submitted-product list screen (not shown, a screen listing products submitted by the submitter) prepared in the message video delivery service and displayed on the terminal 2, a purchaser list screen of the selected product appears and a purchaser (purchase ID) is selected in the purchaser list screen. FIG. 10 shows an example of a purchaser list screen dis4. The purchaser list screen dis4 displays information O41 about the product (product for which a video is to be shot) selected by the submitter (e.g., the icon image of the submitter, the product name, the sales period, the creation deadline, the current number of purchasers, and a current sales) and information IO42 about the purchaser who has purchased the product (e.g., the purchase ID, the icon image of the purchaser, the name of the purchaser, and a date of the purchase). The submitter selects one purchase ID from the information IO42 about the purchaser to instruct creation of a video for the selected purchase ID. The purchaser list screen dis4 shown in FIG. 10 lists purchasers who have purchased the product shown in the submission screen dis1 shown in FIG. 7.

The information IO42 about purchasers displayed on the purchaser list screen dis4 shown in FIG. 10 is specifically the purchase IDs for which a message video has yet to be created. The purchaser list screen dis4 may be displayed in a different format, and for example, may also include IDs for which message videos have been created and display flags indicating whether a message video has been created for each purchase ID. In this case, only purchase IDs for which a message video has not been created may be selected.

When receiving the request to display a video creation screen from the terminal 2 held by the submitter, the server 1 creates video creation screen data by retrieving the relevant purchase data d30 from the purchase DB 113 based on the selected purchase ID and retrieving the relevant submission data d20 from the submission DB 112 based on the submission ID of the selected product (step S34), and then sends the video creation screen data to the terminal 2 held by the submitter (step S35). The video creation screen data includes the icon image of the purchaser, the playback time (shooting time), the nickname (in kanji or kana), the message, the message selection tab, the requests, and the request tab.

Figure 11:
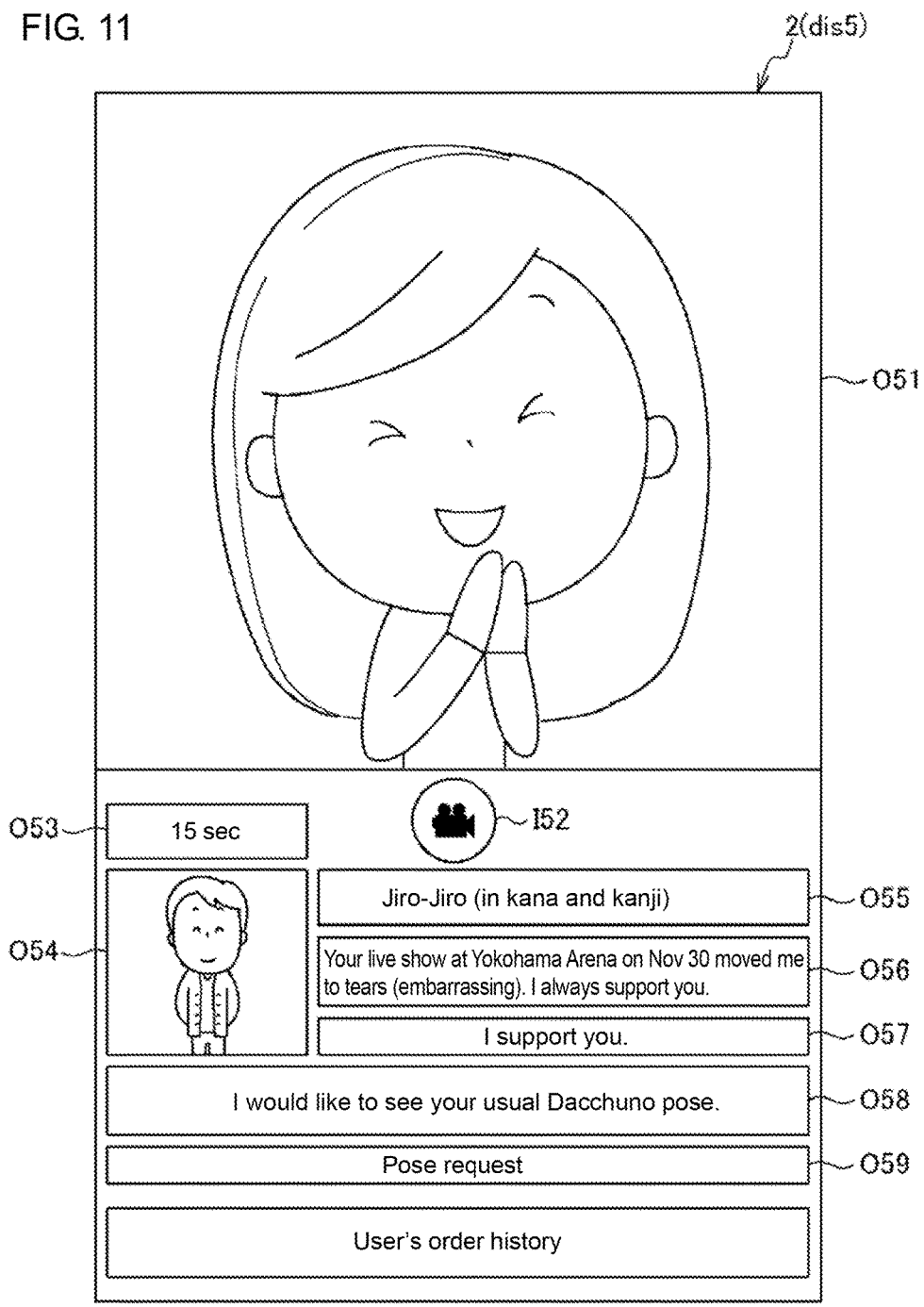
FIG. 11 is an example of a video shooting screen used in the message video delivery system according to the embodiment of the present invention.

When receiving the video creation screen data, the terminal 2 held by the submitter displays a video creation screen dis5 based on the received video creation screen data (step S36). FIG. 11 shows an example of the video creation screen dis5. The video creation screen dis5 displays a playback time (shooting time) O53 (e.g., 15 seconds), an icon image O54 of the purchaser, a purchaser nickname (in kanji or kana) O55 (e.g., Jiro-Jiro), a message O56 (e.g., Your live show at Yokohama Arena on 30 November moved me to tears (embarrassing). I always support you.), a message selection tab O57 (e.g., I support you.), a request O58 (e.g., I would like to see your usual Dacchuno pose.), a request tab O59 (e.g., Pose request), and a self-shot video O51 shot with the imager 23 (e.g., video of the artist A). The video creation screen dis5 shown in FIG. 11 displays the request information d32 input by the user B in the request input screen dis3 shown in FIG. 9.

This allows the submitter to shoot the self-shot video O51 while viewing the request information d32 displayed on the video creation screen dis5. In other words, after viewing the request information d32 to understand the request, the submitter presses a shoot button I52 to start shooting the message video d41 (step S37). This message video d41 is a self-shot video responding to the request from the purchaser in which the submitter reads a message aloud or changes the appearance and posture of the submitter based on the request information d32. The submitter then presses the shoot button I52 again based on the displayed playback time (shooting time) or the elapsed time to end shooting the message video. The shot message video d41 is then stored into the storage unit 21 of the terminal 2.

Figure 12:
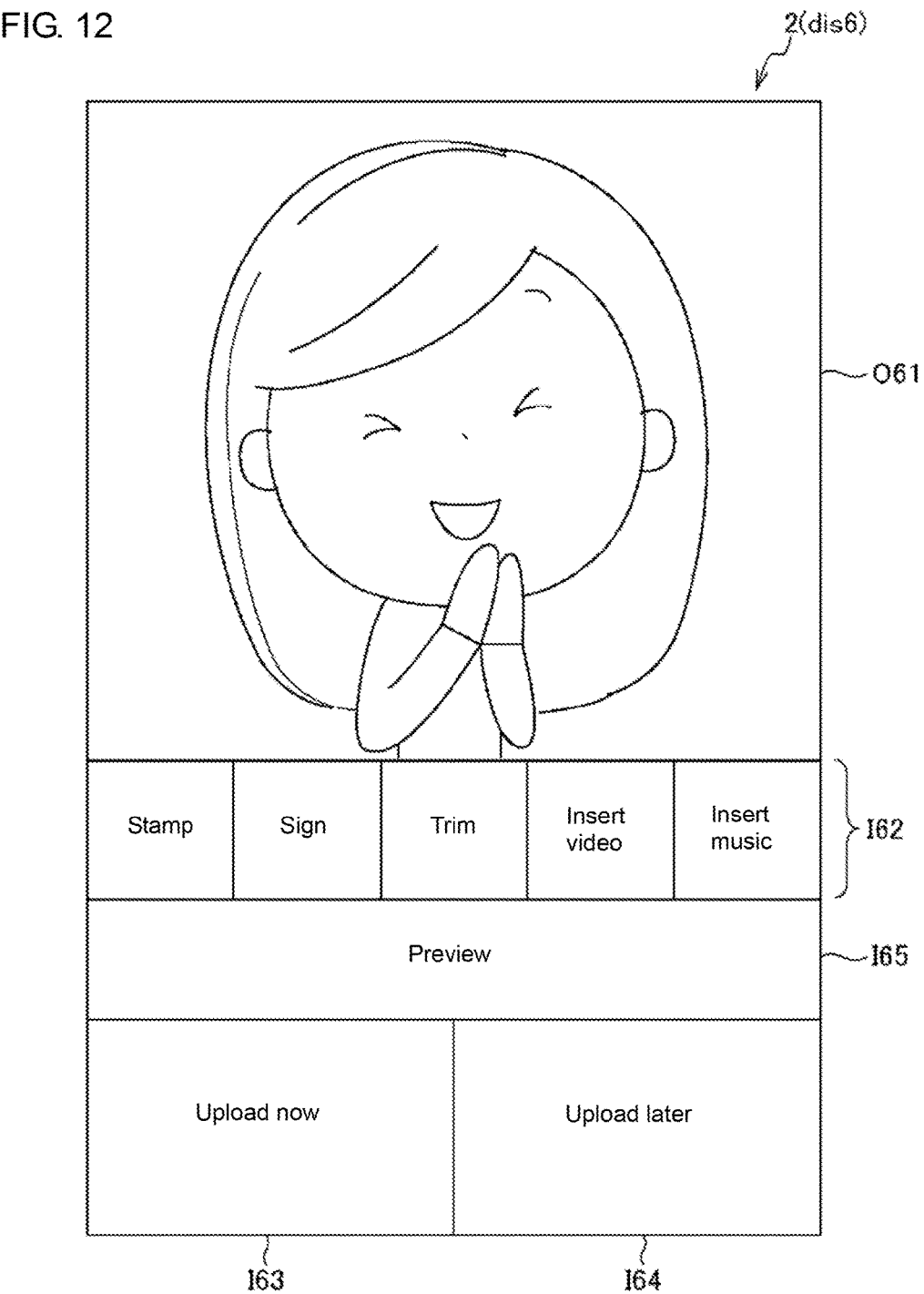
FIG. 12 is an example of an upload screen used in the message video delivery system according to the embodiment of the present invention.

After the message video d41 is shot, the terminal 2 held by the submitter displays an upload screen dis6 (step S38). FIG. 12 shows an example of the upload screen dis6. The upload screen dis6 contains an upload button I63 (e.g., a button representing "Upload now") and a button to exit the upload screen dis6 (e.g., a button representing "Upload later"). The upload screen dis6 additionally contains various edit buttons I62 (e.g., buttons for a stamp, a sign, trimming, inserting a video, and inserting music) to allow editing of the shot message video d41. The shot message video d41 and the edited message video d41 may be played back on a display unit O61. This allows the submitter to self-check the shot message video. When the message video is unsatisfactory, the submitter may shoot another message video by repeating the processing in step S37.

When the submitter instructs an upload by pressing the upload button I63 on the upload screen dish (step S39), the terminal 2 held by the submitter sends the shot message video d41 to the server 1 (step S40).

When receiving the message video d41, the server 1 creates the video data d40 based on the selected purchase ID and the message video d41, and enters the created video data d40 into the video DB 114 (step S41).

Although the video entry process shown in FIG. 5 uploads a single shot message video d41 to the server 1 at a time (step S39), multiple shot message videos d41 may be uploaded at a time. In this case, message videos to be uploaded are selected in a batch upload screen (not shown), and the selected message videos (shot message videos that have yet to be uploaded) are uploaded at a time.

Figure 13:
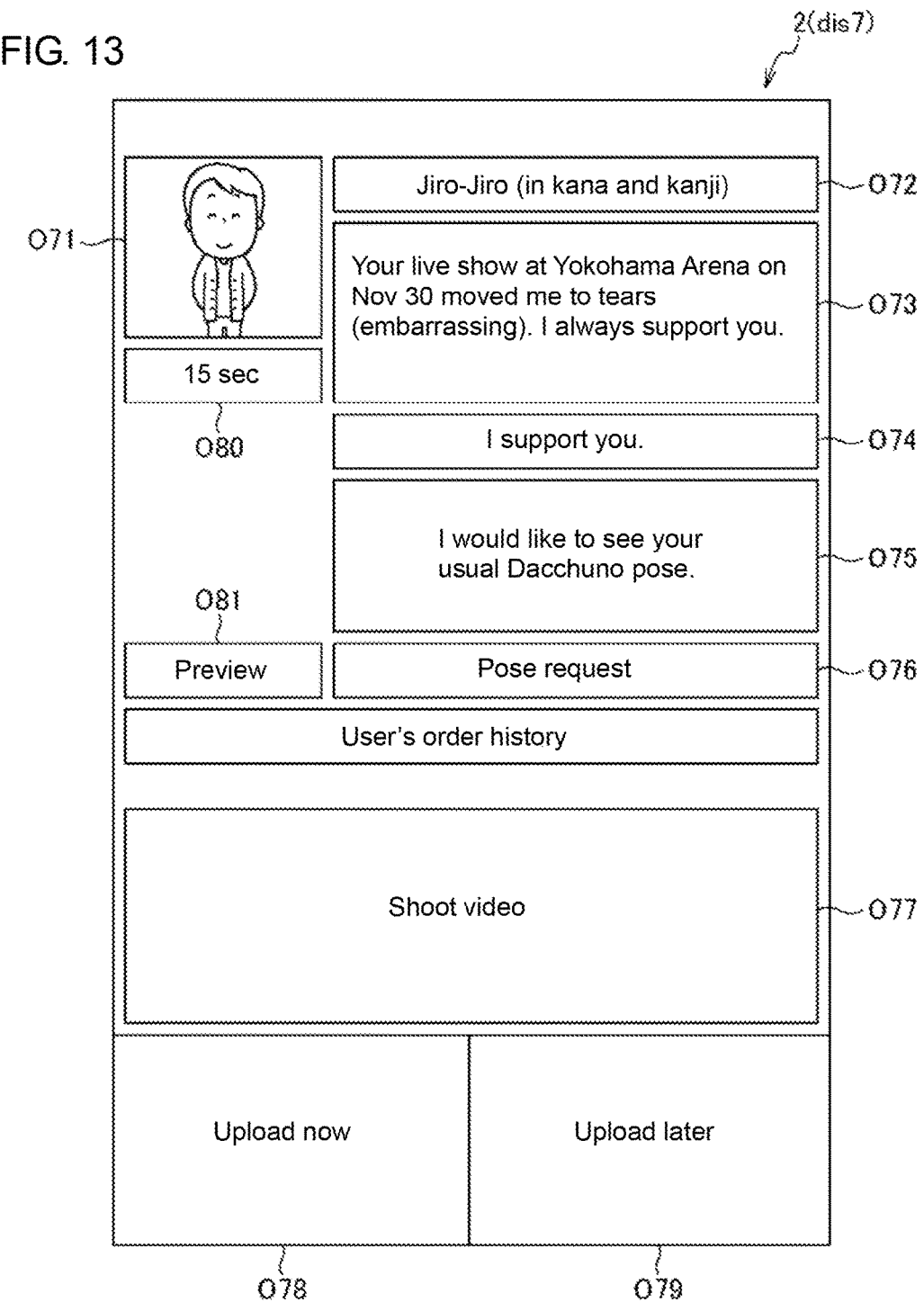
FIG. 13 is another example of a video shooting screen used in the message video delivery system according to the embodiment of the present invention.

Although the video creation support process and the video entry process are performed with the function of the terminal application of the terminal 2 in the purchase process shown in FIG. 5, the browser function of the terminal 2 may be used instead to perform the video creation support process and the video entry process. In this case, the server 1 creates the video creation screen based on the video creation screen data and sends the created video creation screen to the terminal 2 held by the submitter in step S34. FIG. 13 shows a video creation screen dis7 created with the browser function of the terminal 2. In this case, when the submitter views sets of displayed request information O72 to O76 and then presses a shoot button O77, a video camera application included in the terminal 2 is activated, hiding the sets of request information O72 to O76 during video shooting. In other words, although the submitter cannot view the request information d32 during video shooting unlike the video creation screen dis5 shown in FIG. 11, the submitter can create a message video responding to requests from the purchaser by remembering the request information d32.

The video creation support process and the video entry process according to the present embodiment allow the submitter to view the request information d32 input by the purchaser, or various requests for voice and an image of a self-shot video while self-shooting a video. This enables the submitter to easily create a message video reflecting the preference of the purchaser. The resultant personal message video reflects the preference of the purchaser.

Video Output Process

Figure 6:
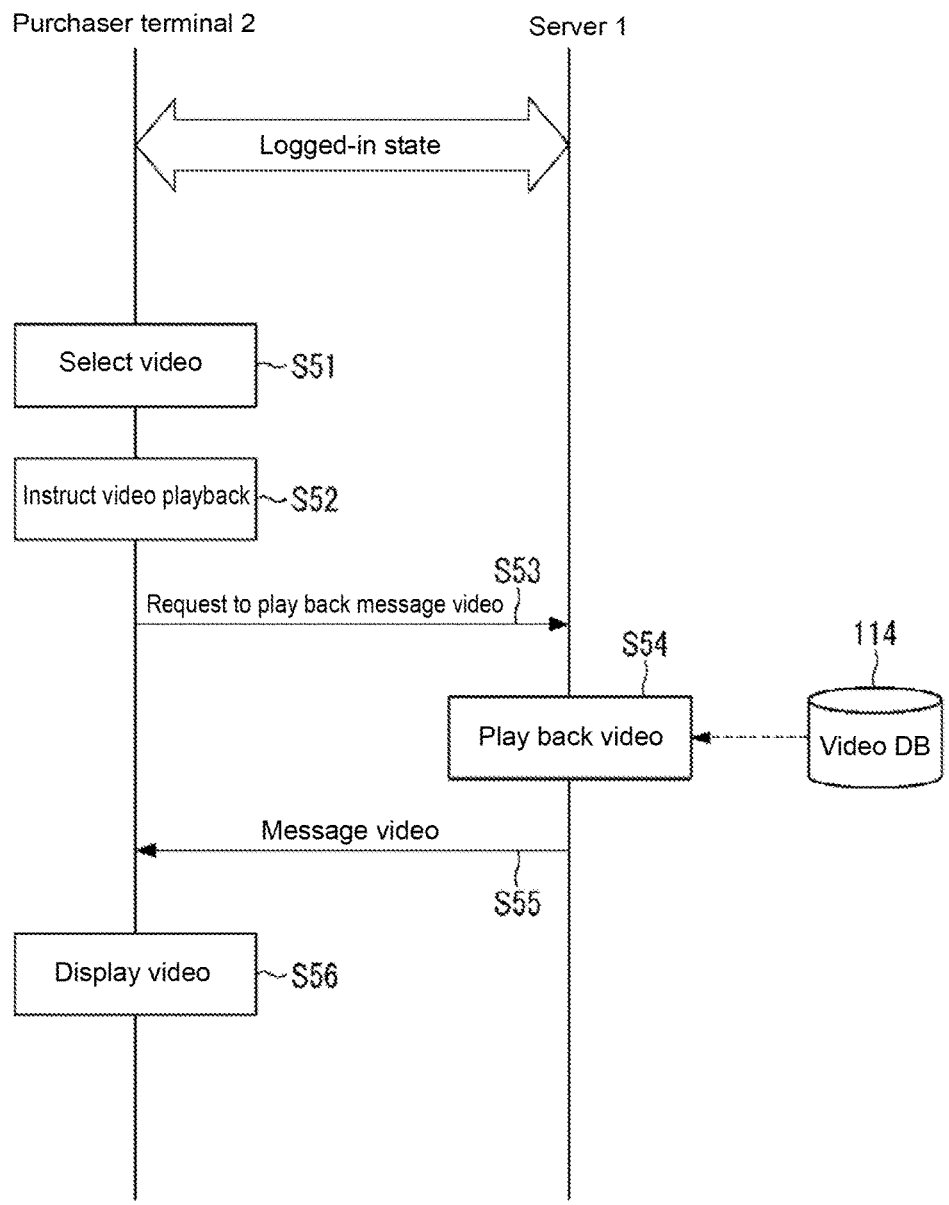
FIG. 6 is a flowchart showing a video output process performed by the message video delivery system according to the embodiment of the present invention.

The video output process performed by the message video delivery system 100 will now be described with reference to FIG. 6. FIG. 6 is a sequence diagram showing the video output process performed by the message video delivery system 100, in which a message video is streamed.

The purchaser selects a message video using the terminal 2 held by the purchaser (step S51), and instructs playback of the selected message video (step S52). For example, a video selection screen prepared in the message video delivery service lists products (message videos) purchased by the purchaser. The purchaser then selects a message video to play from the list, and instructs playback of the selected message video. As a result, a request to play the selected message video is sent from the terminal 2 held by the purchaser to the server 1 (step S53).

When receiving an instruction to play back the message video from the terminal 2 held by the purchaser, the server 1 selects the corresponding video data d40 from the video DB 114 based on the purchase ID of the selected message video, and plays back the message video d41 of the selected video data d40 (step S54). The played message video d42 is then sent to the terminal 2 held by the purchaser (step S55).

When receiving the message video d41 from the server 1, the terminal 2 held by the purchaser plays the message video d41 (step S56).

The video output process according to the present embodiment described above allows the purchaser to view the purchased message video d41 by instructing the video playback, and enjoy the personal message video d41 at any time and any location. Additionally, a message video may be delivered by downloading or as being stored in a storage medium, instead of streaming playback to allow the purchaser to enjoy the message video d41 at any time and any location.

The message video delivery system 100 according to the present embodiment described above allows, for example, an artist to deliver, to each individual fan, his or her personal message video that reflects requests from each fan, and thus enables private communication satisfying both the artist and the fan.

More specifically, the artist can directly communicate with his or her fans outside events and thus let the fans feel close to the artist and stay as fans for a long time. The fans can have private communication without being observed by other fans, and thus may feel higher satisfaction.

Although the submitter is a solo artist in each of the examples described with reference to FIGS. 7 to 13, the submitter may be an artist group. In this case, multiple persons are shot in a message video.

Although a message video is sold by an artist as an individual product in the present embodiment, the message video may be delivered with any other method. For example, a message video may be attached to, for example, a downloadable product such as data or an image (a still image or a moving image) sold through a predetermined web site, or to a purchased physical product such as goods. In other embodiments, a message video may be provided in response to a request sent using a voucher included in a purchased product, such as a CD, sold at a physical store, such as a CD shop.

Other Embodiments

Although the first user, who provides a video message, is an artist and the second user, who purchases a video message, is a fan of the artist in the above embodiment, the first user and the second user may not be these persons. The first user may be any person who has a large number of unspecified fans, and may for example be a sport player or a celebrity, who may deliver a personal video message to the fans. Although the first user delivers a video message to multiple second users in the embodiment described above, the first user may deliver a video message to a single second user. The method is applicable to communication for other than the sales of products, such as communication between persons close to each other who cannot communicate with each other in real time (e.g., a pair of lovers) using the function of the message video delivery service to deliver, to the other person, a message video responding to a request from the other person. In this case, part of the product information d21 the price, the sales period, and the sales quantity) is eliminated.

The message video delivery system 100 according to the above embodiments is applicable to communication between two parties who intend to communicate private video messages with each other.

Although the present invention is described above based on the embodiments, the invention is not limited to the embodiments described above. The embodiments may be modified variously without departing from the spirit and scope of the invention. Such modifications fall within the technical scope of the present invention. The effects and the advantages described in the embodiments of the present invention are merely the preferred effects and advantages produced by the present invention, and the effects and the advantages of the present invention are not limited to those described in the embodiments of the present invention.

REFERENCE SIGNS LIST 1 message video delivery apparatus (server)
2 user terminal (terminal)
3 communication network
11 storage unit
12 controller
13 communication unit
21 storage unit
22 UI
23 imager
24 communication unit
25 controller
100 message video delivery system
111 user database (user DB)
112 submission database (submission DB)
113 purchase database (purchase DB)
114 video database (video DB)
121 submission information entry unit
122 purchase information entry unit
123 video creation support unit
124 video entry unit
125 video output unit

The invention claimed is:

1. A message video delivery apparatus communicable with a submitter terminal held by a submitter and a purchaser terminal held by a purchaser through a network, the message video delivery apparatus being a server included in a computer system in which the submitter submits a self-shot video with voice as a product and the purchaser purchases the product, the server being configured to deliver, to the purchaser, the self-shot video with voice responding to a request from the purchaser, the apparatus comprising:
a product information receiver configured to receive product information including at least a description of a submitted product, a sales period and a sales quantity of the product, and a record time of a video from the submitter terminal;
a product information sender configured to send the product information received by the product information receiver to the purchaser terminal;
a purchase instruction receiver configured to receive, from the purchaser terminal displaying the product information sent from the product information sender, a purchase instruction for a product displayed on the purchaser terminal;
a request information receiver configured to receive, from the purchaser terminal that has sent the purchase instruction, request information including a request for voice and an image to be self-shot for the purchased product;
a request information sender configured to send the request information received by the request information receiver to the submitter terminal held by the submitter that has submitted the purchased product;
a self-shot video receiver configured to receive, from the submitter terminal displaying the request information sent from the request information sender, a self-shot video with voice shot based on the displayed request information; and a self-shot video sender configured to send the self-shot video with voice received by the self-shot video receiver to the purchaser terminal that has sent the purchase instruction.

2. The message video delivery apparatus according to claim 1, wherein
the request information includes a nickname of the purchaser held by the submitter and a message from the purchaser to the submitter.

3. The message video delivery apparatus according to claim 1, wherein
the request information includes at least one selected from the group consisting of a phrase to be read aloud by the submitter, a song to be sung by the submitter, a costume to be worn by the submitter, and a pose to be taken by the submitter.

4. The message video delivery apparatus according to claim 1, wherein
the submitter terminal displaying the request information sent from the request information sender displays the request information and a self-shot video with voice currently being shot on the same screen.

5. The message video delivery apparatus according to claim 1, wherein
the self-shot video sender sends the self-shot video with voice to the purchaser terminal as a video downloadable by the purchaser terminal or by streaming playback.

6. A message video delivery apparatus communicable with a submitter terminal held by a submitter and a purchaser terminal held by a purchaser through a network,
the message video delivery apparatus being a server included in a computer system in which the submitter submits a self-shot video with voice as a product and the purchaser purchases the product, the server being configured to deliver, to the purchaser, a self-shot video responding to a request from the purchaser, the apparatus comprising:
a submission data storage unit configured to store submission data including, in a manner associated with one another, the submission ID for uniquely identifying a product submitted by the submitter, a submitter user ID for uniquely identifying the submitter of the product, and product information including at least a description of the submitted product, a sales period and a sales quantity of the product, and a record time of a video;
a purchase data storage unit configured to store purchase data including, in a manner associated with one another, a purchase ID for uniquely identifying a purchase of a product by the purchaser, a submission ID of the purchased product, a purchaser user ID for uniquely identifying the purchaser of the product, and request information including a request for voice and an image to be self-shot by the submitter for the purchased product;
a video data storage unit configured to store video data including, in a manner associated with each other, the purchase ID and a message video that is a self-shot video shot by the submitter;
a product information receiver configured to receive, from the submitter terminal, the product information input by the submitter;
a submission data entry unit configured to create the submission data based on the product information received by the product information receiver and the submitter user ID of the submitter that has input the product information, and enter the created submission data into the submission data storage unit;

a first search request receiver configured to receive a first search request associated with the product information from the purchaser terminal;

a product information sender configured to retrieve submission data associated with the first search request received by the first search request receiver from the submission data entered in the submission data storage unit, and send the product information included in the retrieved submission data to the purchaser terminal that has sent the first search request;

a purchase instruction receiver configured to receive a purchase instruction for the product input by the purchaser from the purchaser terminal displaying the product information sent from the product information sender;

a request information receiver configured to receive, from the purchaser terminal that has sent the purchase instruction, the request information including a request for voice and an image to be self-shot for the purchased product;

a purchase data entry unit configured to create the purchase data based on the request information received by the request information receiver, the submission ID of the purchased product, and the purchaser user ID, and enter the created purchase data into the purchase data storage unit;

a second search request receiver configured to receive a second search request associated with the purchase data from the submitter terminal;

a request information sender configured to retrieve purchase data associated with the second search request received by the second search request receiver from the purchase data entered in the purchase data storage unit, and send the request information included in the retrieved purchase data to the submitter terminal;

a self-shot video receiver configured to receive, from the submitter terminal displaying the request information sent from the request information sender, a self-shot video with voice shot based on the displayed request information;

a video data entry unit configured to create the video data based on the self-shot video with voice received by the self-shot video receiver and the purchase ID in the purchase data retrieved by the request information sender, and enter the created video data into the video data storage unit;

an output request receiver configured to receive an output request for the video data from the purchaser terminal; and a self-shot video sender configured to retrieve video data associated with the output request received by the output request receiver from the video data entered in the video data storage unit, and send the self-shot video with voice included in the retrieved video data to the purchaser terminal that has sent the output request.

7. A message video delivery method used in a computer system in which a submitter submits a self-shot video with voice as a product and a purchaser purchases the product, the computer system including a submitter terminal held by the submitter, a purchaser terminal held by the purchaser, and a server communicable with the submitter terminal and the purchaser terminal through a communication network, the server being configured to deliver, to the purchaser, a self-shot video with voice responding to a request from the purchaser, the method comprising:

receiving product information including at least a description of a submitted product, a sales period and a sales quantity of the product, and a record time of a video from the submitter terminal;

sending the received product information to the purchaser terminal;

receiving, from the purchaser terminal displaying the sent product information, a purchase instruction for a product displayed on the purchaser terminal;

receiving, from the purchaser terminal that has sent the purchase instruction, request information including a request for voice and an image to be self-shot for the purchased product;

sending the received request information to the submitter terminal held by the submitter that has submitted the purchased product;

receiving, from the submitter terminal displaying the sent request information, a self-shot video with voice shot based on the displayed request information; and sending the received self-shot video with voice to the purchaser terminal that has sent the purchase instruction.

8. A message video delivery program for delivering, to a purchaser, a self-shot video with voice responding to a request from the purchaser in a computer system in which a submitter submits a self-shot video with voice as a product and the purchaser purchases the product, the computer system including a submitter terminal held by the submitter, a purchaser terminal held by the purchaser, and a server communicable with the submitter terminal and the purchaser terminal through a communication network, the program causing the server to implement:

receiving product information including at least a description of a submitted product, a sales period and a sales quantity of the product, and a record time of a video from the submitter terminal;

sending the received product information to the purchaser terminal;

receiving, from the purchaser terminal displaying the sent product information, a purchase instruction for a product displayed on the purchaser terminal;

receiving, from the purchaser terminal that has sent the purchase instruction, request information including a request for voice and an image to be self-shot for the purchased product;

sending the received request information to the submitter terminal held by the submitter that has submitted the purchased product;

receiving, from the submitter terminal displaying the sent request information, a self-shot video with voice shot based on the displayed request information; and sending the received self-shot video with voice to the purchaser terminal that has sent the purchase instruction.

* * * * *